Inventors
Kurt Sommer
Paul Maca
Edward Edwards
William Budig
By Wallace and Conrow
Attorneys Patented Dec. 24, 1946

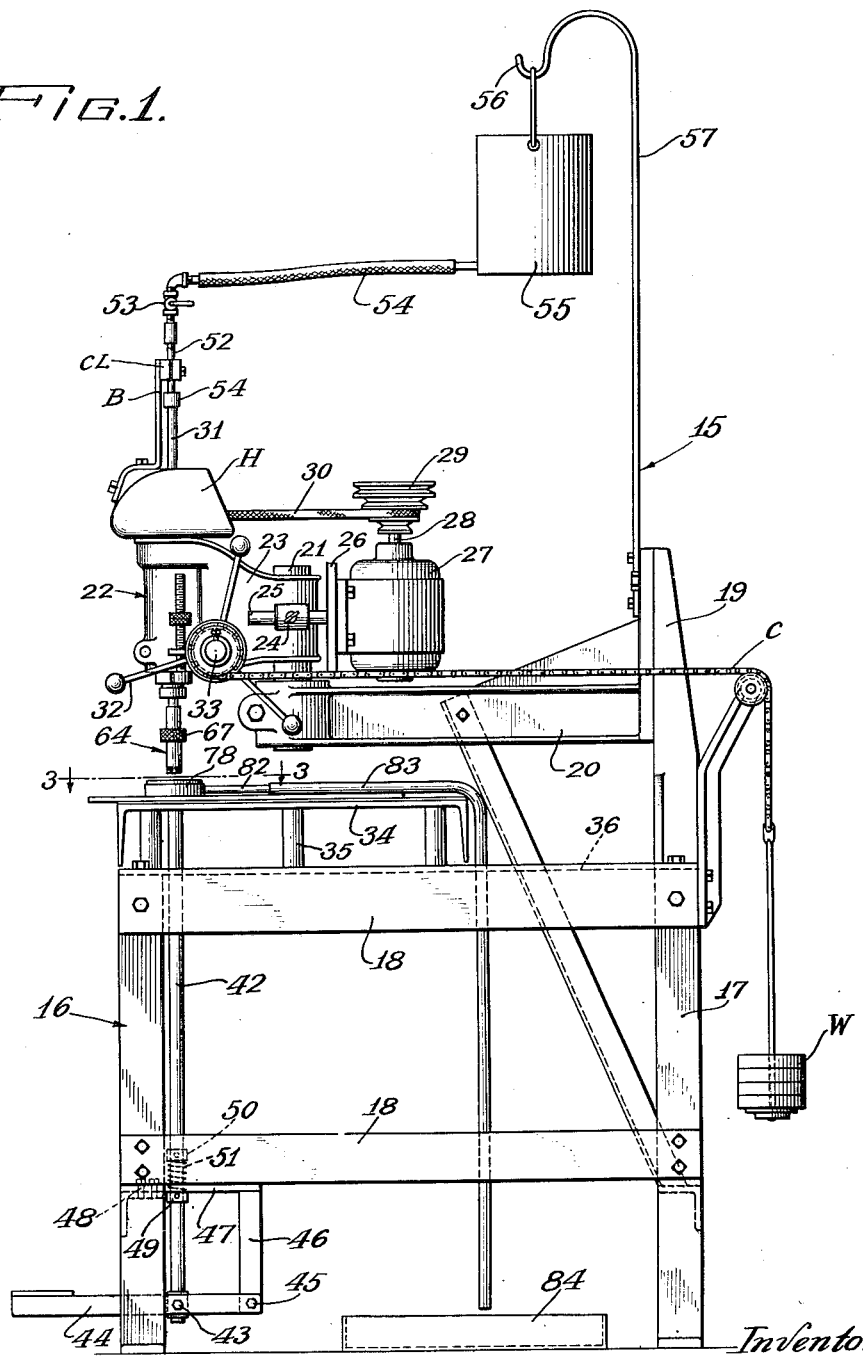

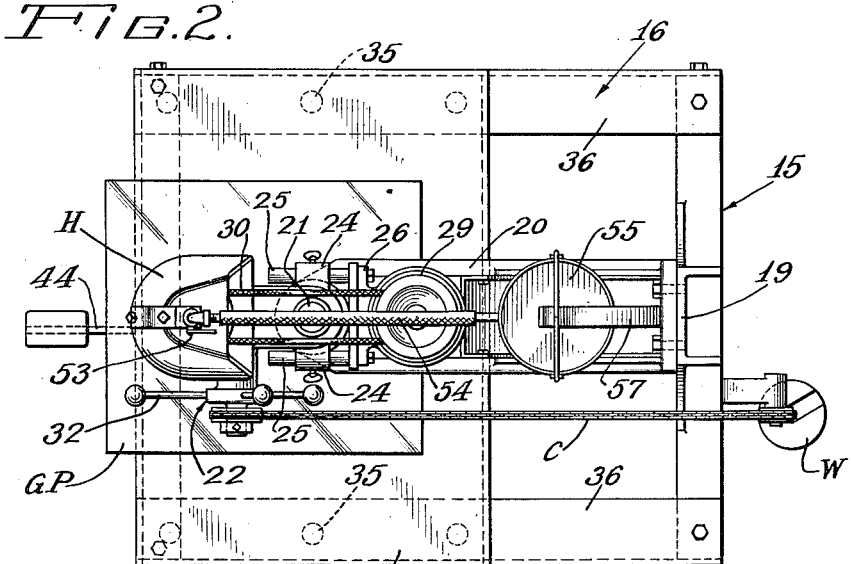
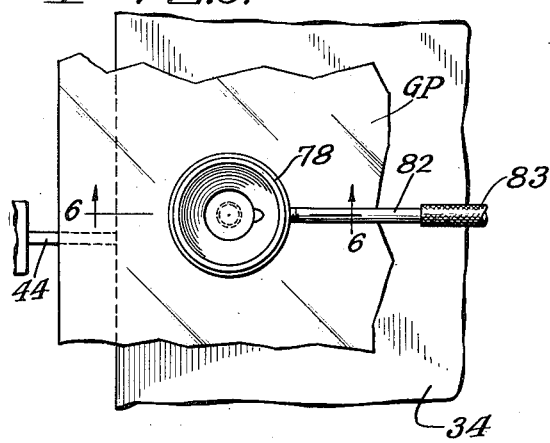
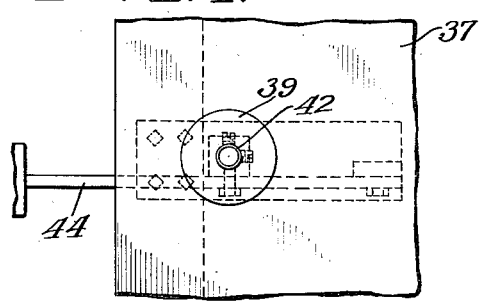
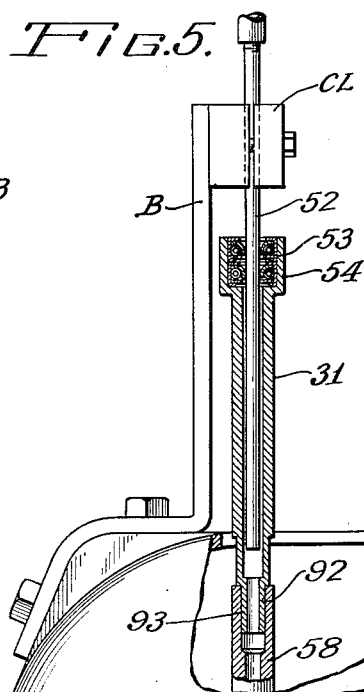

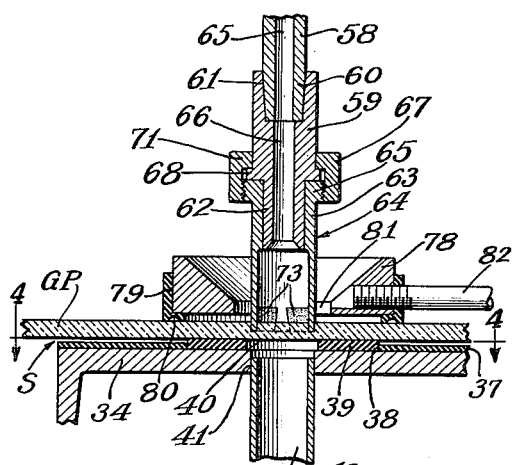
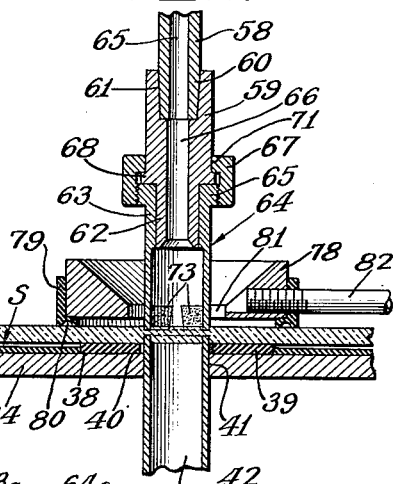
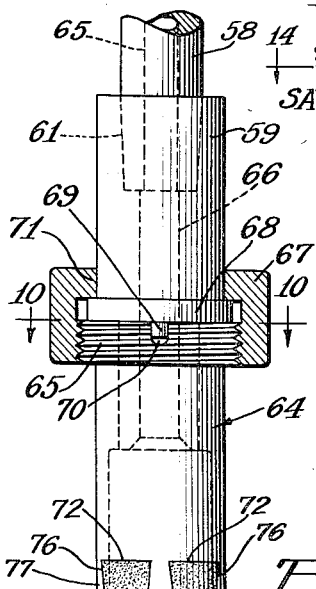
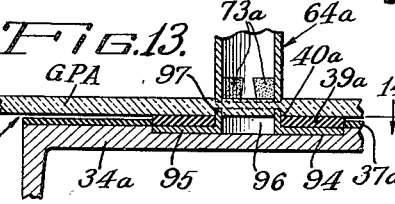
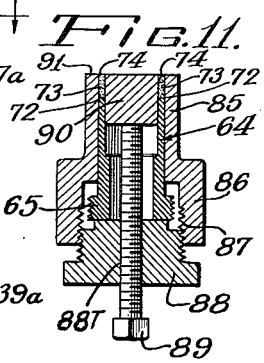
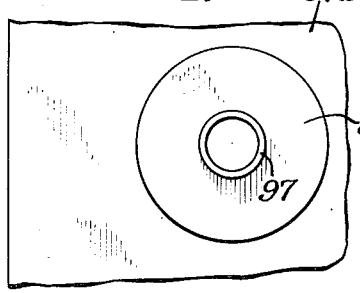
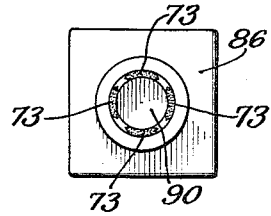
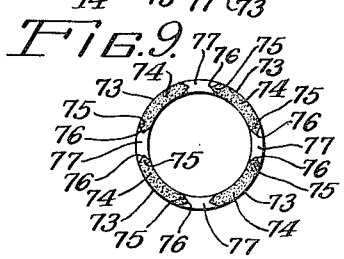
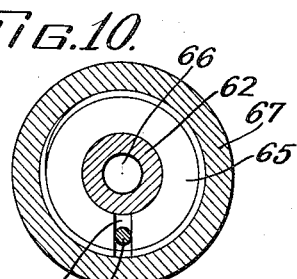
Inventors:
Kurt Sommer
Paul Maca
Edward Edwards
William Budig
By Wallace and Cannon
Attorneys Dec. 24, 1946.  K. SOMMER ET AL  2,413,084
GLASS DRILLING APPARATUS
Filed Jan. 26, 1944  4 Sheets-Sheet 4

2,413,084

UNITED STATES PATENT OFFICE 2,413,084

GLASS DRILLING APPARATUS

Kurt Sommer, La Grange Park, Paul Maca, Hinsdale, and Edward Edwards and William Budig, Chicago, Ill., assignors to said Sommer and said Maca, as trustees Application January 26, 1944, Serial No. 519,718

13 Claims. (Cl. 125—20)

This invention relates to a glass drilling apparatus especially adapted for use in drilling holes in flat glass and other flat ceramic materials, to a novel tubular metal diamond drill bit therefor, and to a method of making said tubular metal diamond drill bits.

Numerous problems are encountered in the drilling of holes in flat glass and like ceramic materials and certain of these are due to the peculiar nature and properties of such materials and various drills have heretofore been designed and employed for use upon such ceramic materials. Some of such prior drills have been, in general, satisfactory for special purposes and limited use.

Thus, for example, certain prior portable glass drills have been satisfactory for drilling isolated holes in ceramic tile, concrete floors, and the like and in which precision and accuracy are not of paramount importance. However, such portable drills have not been satisfactory for quantity production and work in shops, factories and the like and in which large numbers of holes must be drilled in flat glass and in which speed, precision drilling and accuracy of the hloes formed, and long life of the drill bits, are required. Such portable glass drills have comprised, in general, a tubular rotary motor-driven slotted metal drill bit to the abrading surface of which a finely divided abrasive material is supplied so as to effect the abrading operation. Such portable glass drills have also generally embodied an annular sealing gasket which surrounds the axially outer end or abrading portion of the slotted drill bit so as to confine the finely divided abrasive material within a predetermined area upon the surface of the glass through which the bit is drilling.

One of the reasons why such portable glass drills have not been entirely satisfactory for quantity and precision work in glass shops and factories resides in the fact that the finely divided abrasive material employed in conjunction with the slotted drill bits of such portable glass drills to effect the drilling operation frequently causes scratching of the surface of the flat glass or like ceramic material after the drilling operation has been completed and the flat glass or like ceramic surface is wiped to remove excess of the finely divided abrasive material employed during the drilling operation. Such scratch marks are decidedly objectionable in flat glass plates and especially in flat glass intended for use as windows, in making mirrors and in other uses of flat glass in which ornamental appearance and freedom from scratch marks are important factors.

Moreover, it has been found to be impossible to drill holes of very accurate and uniform diameter throughout their entire extent when employing a portable glass drill embodying a slotted metal drill bit and a finely divided abrasive material because the finely divided abrasive material tends not only to abrade the glass upon which the drill bit is operating but also the wall of the slotted metal drill bit itself. Thus it has been observed that as the drill bit progresses through the ceramic material the thickness of the wall of the cutting portion of the slotted metal drill bit is reduced. This results in the hole thus formed being of small diameter at the top or outer surface where the bit enters than it is at the bottom or inner surface where the bit emerges and hence the resulting hole is tapered and is not of uniform diameter throughout its entire extent. This is particularly objectionable where precision and accuracy are required as in drilling holes in flat glass plates intended for various uses.

Accordingly, an object of the present invention is to provide a new and improved glass drill which, in use, overcomes the foregoing and other difficulties heretofore experienced in the use of portable glass drills.

Another object of the present invention is to provide a new and improved glass drill which will expeditiously drill precision holes of uniform diameter in flat glass and like ceramic materials and without the use of any added or extraneous finely divided abrasive material so that scratching of the surface of the glass or other ceramic material as an incident to or after the drilling operation is avoided.

A further object of the invention is to provide a new and improved drill which is especially designed for use in glass shops, glass factories, mirror factories, and the like, for rapid drilling accurately formed holes in flat glass upon a production or quantity basis rather than and as distinguished from drilling occasional holes in isolated pieces of ceramic work such as in ceramic tiling, concrete floors and walls, and the like, and for which the portable slotted metal bit ceramic drills of the prior art were especially adapted.

An additional object of the invention is to provide in the new glass drill a novel construction and arrangement for drilling accurately formed holes in flat glass without necessitating that any added or extraneous finely divided abrasive material be supplied to the drill bit during the drilling operation while, at the same time, preventing the drill bit from fracturing the flat glass at one side of the holes being formed therein as has occurred in the unsuccessful use of certain prior art glass drills.

A further object of the invention resides in the provision of a novel work locating or work guiding means or device for effecting coaxial alignment of a partially drilled hole or cutout angular recess formed in one side of a sheet of flat glass with a tubular rotary drill bit arranged upon the opposite side of the said sheet of flat glass from the said partially drilled hole and above the latter so as to assure accurate alignment and meeting of the holes drilled partially through the flat glass sheet from opposite sides thereof.

A further object of the invention is to provide a new and improved ceramic material drilling apparatus which embodies a hollow tubular metal glass drill bit having finely divided diamond particles or diamond dust particles mounted in notches provided in the cutting edge thereof whereby when the hollow tubular metal drill bit is rotated the finely divided diamond particles will effect an abrading operation upon a sheet of flat glass plate without the addition or use of any added or extraneously finely divided abrasive material such as it has been necessary to employ heretofore in connection with glass drills embodying a hollow tubular metal drill bit.

Another object of the invention resides in the provision of a novel method of making the new tubular diamond drill bit and in the provision of a novel method for mounting the finely divided diamond particles of diamond dust particles in notches provided therefor in the cutting edge of the new tubular diamond drill bit.

An additional object of the invention resides in the provision of a novel method for mounting the finely divided diamond particles or diamond dust particles in or upon the metallic body of the new tubular diamond drill bit in such a manner and form that such diamond particles will be disposed in contact with the glass work during the drilling operation.

An additional object of the invention is to provide, in one form thereof, a novel device for positively and mechanically and automatically ejecting from the lower end portion of the tubular diamond drill bit a glass plug which may be disposed therein after and as a result of drilling a hole through a plat of flat glass or the like, so as to prevent possible damage to or rupture of the tubular diamond drill bit when the next succeeding drilling operation is initiated.

Other and further objects of the present invention will be apparent from the following description and claims and will be understood by reference to the accompanying drawings which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a stationary glass drill embodying the present invention;

Fig. 2 is a top plan view of the new glass drill shown in Fig. 1;

Fig. 3 is an enlarged fragmentary top plan view on line 3—3 in Fig. 1;

Fig. 4 is a top plan view on line 4—4 in Fig. 6;

Fig. 5 is a fragmentary view partly in vertical section and partly in elevation showing the arrangement of the drill bit spindle, the rotary shaft for operating the spindle, and the water pipe for supplying water or like cooling fluid to the interior of the drill bit during the drilling operation;

Figure 15:
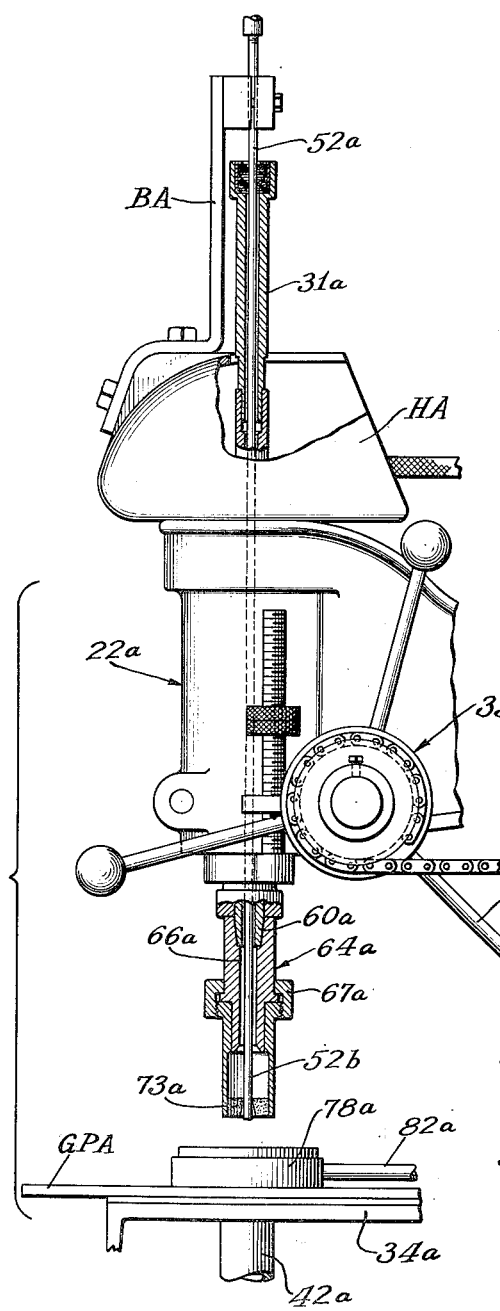
Figure 16:
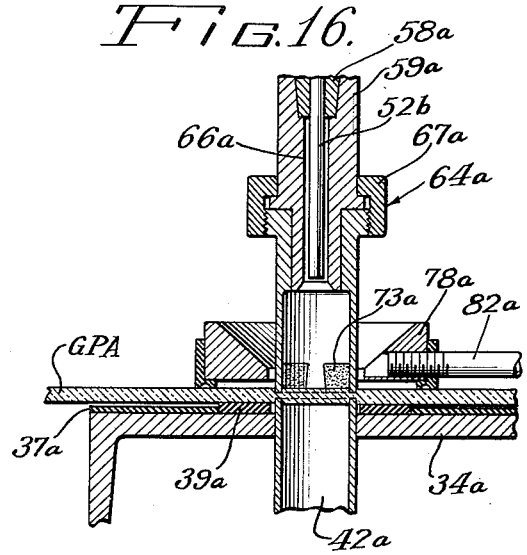
Figure 17:
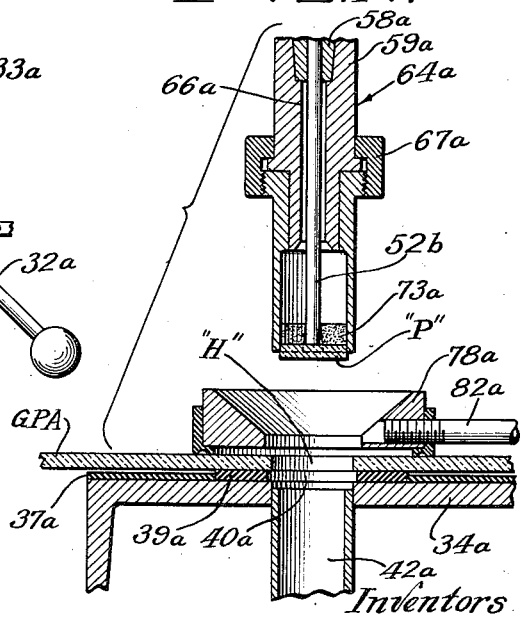

Fig. 6 is an enlarged vertical sectional detail view on line 6—6 in Fig. 3 showing one manner of mounting the new tubular diamond drill bit upon its supporting adapter and spindle and also showing the relative positions of the drill bit and of the tubular guide coaxially aligned therewith and disposed therebelow during the initial stage of a typical operation of the new glass drill in drilling through a sheet of flat glass;

Fig. 7 is a fragmentary central vertical sectional view of the parts shown in Fig. 6 but showing the flat glass work illustrated in Fig. 6 and the positions of the glass drill and tubular guide at a later stage during the hole drilling operation;

Fig. 8 is a detail view, partly in section and partly in elevation, illustrating the mounting of a preferred form of the tubular diamond drill bit upon an adapter provided therefor and embodied in the new glass drilling apparatus;

Fig. 9 is a bottom plan view of the new tubular diamond drill bit shown in Fig. 8;

Fig. 10 is a sectional detail view on line 10—10 in Fig. 8;

Fig. 11 is a central longitudinal sectional view illustrating one form of mold which may be employed in forming the abrasive inserts in the notches provided for the reception thereof in the lower or bottom edge portion of the wall of the new tubular drill bit embodied in the present invention;

Fig. 12 is a top plan view of the mold shown in Fig. 11 and showing one of the new completed tubular drill bits arranged therein after the completion of the molding and fusing operations;

Fig. 13 is a fragmentary vertical sectional view illustrating a modified form of work locating or work guiding member which may be embodied in the new glass drill;

Fig. 14 is a top plan view, partly in section, on line 14—14 in Fig. 13, of the modified form of work locating or work guiding member shown in Fig. 13;

Fig. 15 is a fragmentary view, partly in section and partly in elevation, illustrating a modified form of the new glass drilling apparatus;

Fig. 16 is a fragmentary vertical sectional view of the modified form of the invention shown in Fig. 15 and illustrating the parts in one position; and Fig. 17 is a fragmentary vertical sectional view of the device shown in Fig. 16 but showing the parts in another position.

A typical embodiment of the new ceramic drill is shown in the drawings, wherein it is generally indicated at 15, and comprises a relatively stationary supporting frame 16. The supporting frame 16 may be made of any suitable material such as wood, metal or the like, and includes upright supporting legs 17 interconnected and braced by horizontal cross braces 18 suitably connected thereto (Fig. 1).

The supporting frame 16 includes at the rear thereof a centrally arranged upwardly extending supporting member 19 and this supporting member 19 carries a horizontally extending supporting arm 20 which extends forwardly over the upper surface of the supporting frame 16 midway between the sides thereof. A vertically extending swivel bearing post 21 is mounted upon the front end portion of the horizontally extending supporting arm 20 and a drill press head or unit, generally indicated at 20, is arranged upon the supporting frame 16 and includes a supporting bracket 23 which is swivelly mounted upon the swivel bearing post 21 for adjustable horizontal movement above the front end portion of the supporting frame 16. The drill press head or unit 22 is of known design and construction and is currently available upon the market, and may be of the so-called "Atlas" type, and hence need not be described in detail herein except as may be necessary to afford an understanding of the present invention and as to the manner in which the drill press head or unit 22 is modified for use in the present invention.

Mounted upon the supporting bracket 23 at the sides thereof (Fig. 1) are a pair of bearing sleeves 24 and a horizontally extending supporting rod 25 is slidably mounted in each of the bearing sleeves 24. A supporting bracket 26 is carried by the slide rods 25 and an electric motor 27 is mounted upon the supporting bracket 26. The electric motor 27 has a vertically extending drive shaft 28 on which a variable speed pulley unit 29 is mounted. A flexible power-transmitting element in the form of a belt 30 is adapted to work selectively upon any one of the variable speed pulleys in the variable speed pulley unit and upon a conventional driving mechanism (not shown) but which is arranged in a housing H which is disposed above the drill press head 22, so as to rotate a vertically extending hollow spindle 58 (Fig. 5) which is embodied in the drill press head or unit 22, and which carries a tubular drill bit 64, as will be described more fully hereinafter. The vertically extending hollow spindle 58 and the drill bit 64 carried thereby are mounted so as to be vertically adjustable in and relative to the drill press head 22.

A reduced lower end portion 92 of a vertically extending and vertically slidable tubular sleeve 31 is frictionally fitted in a correspondingly shaped socket 93 in the hollow spindle 58 (Fig. 5).

As shown in Fig. 5, the vertically slidable tubular sleeve 31 has an enlarged upper end portion 54 in which antifriction packing 53 is arranged and a vertically extending water-conducting pipe 52 extends downwardly through the anti-friction packing 53 and through the body of the sleeve 31. The pipe 52 is supported by a clamp CL which is attached to an upright supporting bracket B which is mounted upon the wall of the housing H (Fig. 5). As shown in Fig. 1, the pipe 52 communicates at its upper end with a manually operable control valve 53 which is arranged in a water supply line 54 which, in turn, communicates with a water supply source 55. The water supply source 55 may take any suitable form, such as a municipal tap water line, but for the purpose of illustrating the present invention it is shown as being in the form of a water container carried by a hook-shaped portion 56 of an upright supporting arm 57 which is attached at its lower end to the upright supporting member 19 (Fig. 1).

The vertically extending rotary hollow spindle 58 and the sleeve 31 attached thereto may be adjusted vertically in and relative to the drill press head 22, and relative to the water pipe 52, by means under control of a manually operable and rotatable handle or spider 32 which is rotatably mounted, as at 33, upon one side of the drill press head 22, (Fig. 1), in a manner and by means which are well understood in the art of drill presses, and hence need not be described in detail herein. It will be noted, in this connection, and as shown in Figs. 1 and 2, that the rotary hollow spindle 58 and the drill bit 64 and the sleeve 31 are urged into their lowered position, relative to the work, by means of a weight W which is attached to one end portion of a sprocket chain C which works around the hub of the rotary handle or spider 32.

The supporting frame 16 embodies a horizontally extending work supporting table 34 which may be of any desired length relative to the overall front to rear dimension of the supporting frame 16 but is shown (Fig. 2) as being somewhat shorter than the overall front to rear length of the supporting frame 16 while having the same width as the suporting frame 16. As shown in Fig. 1, the work supporting table 34 is supported upon relatively short vertically extending supporting posts 35 which are mounted upon and above horizontally extending side rails 36 which are embodied in the supporting frame 16.

As shown in Figs. 6 and 7, a resilient pad 37 of rubber or equivalent resilient material is arranged upon the upper surface of the work supporting table 34 and this resilient pad 37 is provided with an opening 38 in which a correspondingly shaped and sized resilient disc or cushioning member 39 is arranged. It will be noted, in this connection, that the resilient cushioning member 39 is somewhat thicker than the pad 37 so that the upper surface of the resilient cushioning member 39 projects slightly above the upper surface of the pad 37, for a reason which will be explained hereinafter.

As also shown in Figs. 6 and 7, the resilient disc or cushioning member 39 is provided with a centrally arranged opening 40 and the work supporting table 34 is provided with an opening 41 which is coaxially aligned with the opening 40 in the resilient cushioning element or disc 39.

The form of the new ceramic drill shown in Figs. 1 to 7, inclusive, embodies a vertically extending tubular work guiding or work locating member 42 which may be made of metal or other suitable material. This member 42 has an upper end portion which is normally slidably disposed in the opening 41 in the work supporting table 34 (Fig. 6) and is adapted to be slid upwardly through the hole 40 in the resilient cushioning element 39 (Fig. 7). The lower end portion of the vertically extending and vertically slidable tubular work guiding or work locating member 42 is pivotally connected, as at 43, to a foot treadle lever 44 (Fig. 1) which has a portion which extends forwardly of the front of the supporting frame 16 so that it may be operated by a workman or operator of the new ceramic drill. The rear end portion of the foot treadle lever 44 is pivotally connected, as at 45, to a vertically extending stationary supporting arm 46 of the supporting bracket 47 which is attached, as at 48, to an upright portion of the supporting frame 16 (Fig. 1). The lower end portion of the vertically extending tubular member 42 is slidably guided through an opening formed in the horizontally extending bracket 47 and a spacing collar 49 is mounted upon the lower end portion of the vertically extending tubular member 42 below the horizontally extending bracket 47. A second spacing collar 50 is mounted upon the lower end portion of the vertically extending tubular member 42, above the horizontally extending bracket 47, and a coil spring 51 is arranged upon the tubular member 42, between the two spacing collars 49 and 50, and normally urges the tubular member 42 upwardly into the position in which the parts are shown in Figs. 1 and 7, so as to project the upper end portion of the tubular member through the opening 40 in the resilient cushioning member 39 and above the upper surface of the resilient cushioning member 39, for reasons which will be explained hereinafter.

As shown in Figs. 6 and 7 the hollow spindle 58 has a tapered lower end portion 60 and an adapter 59 is provided with a correspondingly tapered socket 61 for the reception of the tapered lower end portion 60 of the spindle 58. As is also shown in Figs. 6 and 7, the spindle 58 has a central passage 65 therein and this passage 65 communicates with a central longitudinally extending passage 66 in the adapter 59. As also shown in Figs. 6 and 7, the adapter 59 has a reduced lower end portion or shank 62 which projects into the upper end portion 63 of a tubular metal drill bit 64 which is embodied in the invention, the tubular metal drill bit being detachably attached to the spindle 58 by the adapter 59 in a manner which will now be described.

In order to detachably mount the new tubular ceramic drill bit 64 upon the adapter 59 the drill bit 64 is provided at its upper end with an externally threaded annular flange 65 and an internally threaded coupling ring or nut 66 is mounted upon and carried by the adapter ring 59. This coupling ring or nut 67 is retained upon the body of the adapter 59 by an inwardly projecting annular flanged portion 71 thereof which projects over and above a correspondingly shaped and sized annular retaining flange 68 which is formed upon the body of the adapter 59 immediately above the upper end of the reduced lower end portion or shank 62 of the adapter 59.

In order to prevent rotation of the tubular drill bit 64 relative to the adapter 59 when these parts are coupled together by the coupling ring or nut 67 the annular flange 68 on the adapter 59 is provided, upon its lower surface, with a depending pin or key 69 which projects into a corresponding slot 70 which is formed in the externally threaded flange 65 on the drill bit 64, as shown in Figs. 8 and 10.

The lower or bottom edge portion of the drill bit 64 is provided with an annular row of radially spaced notches 72 which are preferably V-shaped or keystone-shaped in form and arranged in each of these notches is an abrasive insert or body 73 of abrasive-containing material which will be described in detail hereinafter. As shown in Fig. 8, the abrasive bottom edge or surface 74 of each of the abrasive inserts or bodies 73 is disposed flush with the bottom edge portions 75 of the metal wall of the tubular drill bit 64 and, as shown in Fig. 9, the lateral or side edges 75 of the abrasive inserts 73 are preferably V-shaped in form and fit into corresponding V-shaped recesses 76 formed in the "fingers" or those portions 77 of the metal wall of the tubular drill bit 64 which are disposed between the abrasive inserts 73 (Figs. 8 and 9).

A sheet of flat glass plate GP or other flat ceramic material is shown as being arranged upon the work supporting table 34 and a dish-shaped drain member 78 is removably arranged upon the upper surface of the work or flat glass plate GP. The dish-shaped element 78 has a rubber or like resilient sealing element or gasket 79 mounted thereon and this resilient sealing element 79 is provided upon its bottom surface with an annular groove 80 which provides a suction grip upon the upper surface of the flat glass plate or like ceramic material GP.

The dish-shaped drain member 78 is provided with a centrally arranged aperture 81 through which the lower and abrasive-bearing end portion of the drill bit 64 is adapted to project, in use, and a drain pipe 82 leads from the interior bottom surface of the dish-shaped drain member 78 to a drain tube or hose 83 which, in turn, extends downwardly from the work table 34 to a receptacle which is shown as having the form of a drain pan 84 which is disposed below the work supporting table 34 or to any other suitable drain or drain pipe which may be provided for the reception of the waste water resulting from the use of water as a cooling fluid in the operation of the new ceramic drill.

The abrasive inserts 73 which are embodied in the new tubular drill bit 64 are preferably composed of a relatively low temperature fusing metallic matrix such, for example, as a mixture of pulverized silver and pulverized brass, or so-called silver solder, having finely divided diamond particles or so-called diamond dust embedded therein and dispersed therethrough.

While the proportions of the metallic matrix material and the diamond particles employed in making the abrasive inserts 73 may be varied considerably we have found that an intimate mixture composed of approximately twenty-five percent, by weight, of equal parts of pulverized silver and pulverized brass, or so-called silver solder, and seventy-five percent, by weight, of finely divided diamond particles or so-called diamond dust of 100 mesh size provides a satisfactory mixture for use in making the abrasive inserts 73. However, diamond particles of from about 80 to about 120 mesh size, or mixtures of diamond particles of different sizes within the range of from about 80 to about 120 mesh, may be employed in making the abrasive inserts 73.

In the practice of the present invention the pulverized abrasive-metallic matrix mixture employed in forming the abrasive inserts 73 may be molded in different ways but one manner of molding these abrasive inserts 73 in the V-shaped or keystone-shaped notches 72 provided therefor in the metal wall of the tubular drill bit 64 is illustrated in Figs. 11 and 12.

Thus a tubular mold 85 is illustrated in Figs. 11 and 12 and includes an enlarged rectangular-shaped base 86 which may be mounted in a suitable support such as a clamping device (not shown). The base 86 of the mold 85 is provided with a threaded opening 87 into which there is threaded an adjusting nut 88 and this adjusting nut 88 is provided with a threaded opening 88T through which there is threaded an elongated screw 89 and this screw 89 carries an adjustable slide block or plug 90 which is adapted to slide within the body of a tubular metal drill bit arranged in the mold 85 and in close contact with the inner surface of the metal wall of said drill bit, for a reason which will become apparent hereinafter.

As shown in Figs. 11 and 12, the metal body of the tubular drill bit 64 is arranged in the mold 85, in inverted position, that is to say, with the normally lower or axially outer end portion of the body of the tubular drill bit 64 resting upon the axially inner or upper end portion of the adjusting screw 89 and with the notched edge portion of the body of the tubular drill bit arranged adjacent to but somewhat below or inwardly of the upper end or end edge portion 91 of the mold 85, as shown in Fig. 11.

When the unfinished tubular drill bit is thus assembled in the mold 85, the diamond dust-pulverized brass and silver metallic matrix mixture may then be inserted into and tamped or packed by means of any suitable small tool into the notches 72 provided therefor in the wall of the tubular drill bit and the metallic matrix-diamond dust mixture will be retained in the notches 72 by the slide block or plug 90 carried by the adjustable screw 89, pending fusing of the relatively low temperature fusing silver-brass or equivalent metal matrix in which the diamond particles are dispersed, as will now be described.

In order to fuse the metallic silver-brass or like silver solder matrix in which the diamond particles are embedded a high temperature flame such, for example, as that of an oxy-acetylene torch, affording a suitable temperature in the order of from about 1400° F. to about 1600° F. may then be applied to the metal or ceramic body of the mold 85 in the area thereof which encloses the diamond dust-pulverized brass and silver mixture in the notches 72 for a suitable length of time as, for example, about twenty minutes. The hot flame thus directed against the finely divided diamond-silver and brass mixture fuses the pulverized silver and the pulverized brass or so-called silver solder but, of course, does not fuse or otherwise affect the high temperature resistant finely divided diamond dust particles and the result is that the diamond dust particles become anchored or embedded in the fused silver-brass metal matrix.

The thus partially formed tubular metal diamond drill bit 64 may thereupon be removed from the mold 85, and allowed to cool and then placed in a suitable die in a hydraulic or like press and subjected to a pressing operation at a suitable pressure such, for example, as 25 tons, thereby completing the operation of forming the new tubular diamond drill bit 64.

In place of employing a mold, as 85, the copper or like metallic body of the drill bit 64 may be arranged in a suitable die and the material of which the abrasive inserts 73 are made then packed in the notches 72 and fused whereupon the parts may be allowed to cool and the die with the drill bit 64 therein then placed in a hydraulic press and subjected to a pressing operation.

It will be noted, in this connection, that the relatively high temperature applied to the metal body of the tubular drill bit during the operation of fusing the matrix for the abrasive particles also fuses said matrices to the metal wall of the tubular drill bit, and which is preferably a relatively soft metal such as copper, and partly by reason of this fact and partly by reason of the V-shape or keystone-shape and the circumferential cross sectional shape of the abrasive inserts 73 and of the notches 72 in which they are disposed said abrasive inserts 73 are finely and permanently anchored in the notches 72 and will resist dislodgment therefrom under the stresses and strains to which the new rotary tubular diamond drill bits 64 are subjected in use. It has also been found, in this connection, that the diamond particles embedded in the abrasive inserts 73 are firmly retained therein although a relatively small number of such particles are probably liberated upon the abrading lower surfaces 74 of said abrasive inserts 73 during and as a result of the drilling operation. Moreover, by reason of the keystone shape of the notches 72 and the abrasive inserts 73, with the larger or wider ends thereof disposed axially inwardly relative to the long axis of the tubular drill bit, the abrasive inserts 73 are effectively prevented from becoming dislodged from the notches 72, and lateral displacement of the abrasive inserts 73 from the notches 72 is further prevented by the V-shaped side edges 75 of the abrasive inserts 73 and the correspondingly shaped and complementary V-shaped recesses or grooves 76 formed in the wall of the tubular drill bit 64.

Thus it has been found that the new tubular diamond drill bit 64 has adequate structural strength to resist the stresses and strains imposed thereon during the operation of drilling through flat glass or like ceramic material and that when thus employed the finely divided diamond particles in the abrasive inserts 73 exert a sufficient and adequate abrading operation while the fused silver-brass metallic alloy or so-called silver solder affords the necessary structural strength to resist the torsional and other stresses and strains to which the drill bit is subjected during ceramic material drilling operations.

It has also been found that the relatively soft copper or equivalent soft metal which forms the side wall of the drill bit 64, and the tongue portions which project downwardly between the abrasive inserts 73, being relatively soft, will wear away as the abrasive inserts 73 are worn away along their lower or axially outer abrading edges 74 so that said abrading lower edges 74 of the inserts 73 are constantly exposed to the glass or like ceramic material or work disposed therebelow during the operation of drilling through a sheet of flat glass or like ceramic material with the new tubular drill bit 64.

Moreover, by reason of the fact that the side wall and the depending tongues 77 of the drill bit 64 are preferably made of relatively soft copper some of the diamond particles become embedded in the depending tongues 77 during and as a result of the fusing and pressing operations and these particles facilitate the abrading operation.

The use and operation of that form of the new ceramic drilling apparatus shown in Figs. 1 to 10, inclusive, are as follows: A plate of flat glass or like ceramic material GP may be arranged and properly located upon the work supporting table 34 and it will be noted that when so arranged the bottom surface of that portion of the glass plate or like ceramic sheet GP through which a hole is to be drilled will rest upon the upper surface of the resilient cushioning element or disc 39 but will be spaced slightly, as indicated at S in Figs. 6 and 7, above the upper surface of the resilient pad 37 so as to cushion that portion of the ceramic sheet GP through which a hole is to be drilled during the drilling operation. The dish-shaped drain member 78 may then be placed upon the glass plate or like work GP in such a position that the central opening 81 therein overlies the area of the work or glass plate GP through which a hole is to be drilled, as shown in Fig. 6.

The operating motor 27 may then be set in operation, by suitable manually operable control means, not shown, and the operating motor 27 will then act, through the shaft 28, variable speed pulley unit 29, and belt 30, to rotate the rotary hollow sleeve 31, spindle 58, adapter 59 and the tubular drill bit 64, whereupon the drill bit 64 may be lowered into contact with the work or flat glass plate GP by manipulation of the rotary handle or spider 32, and its supporting shaft 33 and associated parts, not shown, but which are embodied in the drill press head or unit H.

At or prior to this time the control valve 53 may be opened whereupon water or other cooling fluid will run from the reservoir or water source 55, through the line 54, through the control valve 53 and pipe 52, into the lower end portion of the sleeve 31, thence into and through the hollow spindle 58, through the passage 68, and then into and through the hollow drill bit 64 so as to cool the lower side wall portion and the abrasive inserts 73 which are embedded in the wall of the drill bit 64.

It will be noted, in this connection, that during the drilling operation the waste water or like cooling fluid runs off from the dish-shaped drain member 78 through the drain line 82 into the waste receptacle or pan 84 or into any other suitable receptacle or drain or the like, and that the dish-shaped drain member 78 remains firmly secured and located in proper position upon the glass plate or like work GP by reason of the gripping action of the suction grip resilient sealing ring 79—80 mounted thereupon upon the glass plate or like ceramic sheet GP.

In the use of the new ceramic drill, the hollow tubular metal diamond drill bit 64 is rotated in contact with the ceramic work GP until the hole drilled thereby extends partially through the ceramic work or flat glass plate GP, it being noted that during rotation of the drill bit 64 the finely divided diamond particles embedded in the abrasive inserts 73 engage and abrade the flat glass or like ceramic work GP. The spindle 58, adapter 59, drill bit 64, and sliding sleeve 31 may then be raised by manipulation of the drill press control handle or spider 32 so as to raise the abrading lower portion of the drill bit 64 up out of abrading contact with the work and out of the thus partially drilled hole formed therein (Fig. 6). The dish-shaped drain member 78 and the drain line 82—83 may then be removed from the upper surface of the flat glass or like ceramic material GP whereupon the tubular member 42 may be lowered, against the action of the spring 51, by depressing the foot pedal or treadle 44. The ceramic sheet GP may then be turned over so that the thus partially drilled hole formed therein is faced downwardly under and in coaxial alignment with the tubular drill bit 64 and in coaxial alignment with the upper end portion of the tubular work guiding or work locating member 42, as shown in Fig. 7. During this operation the foot treadle 44 and the tubular guide member 42 are held in their lowered or depressed position, against the action of the spring 51. Upon the completion of this operation the foot treadle 44 may be released whereupon the tubular member 42 will then be raised, by the action of its resetting spring 51, thereby moving the upper end portion of the tubular member 42 into the partially drilled hole in the flat glass plate or like ceramic work GP. The dish-shaped drain member 78 may then be placed upon the upper surface of the flat glass plate or like ceramic work GP, over the area in which the thus partially drilled hole has been drilled, whereupon the spindle 58, adapter 59, drill bit 64 and sliding sleeve 31 may again be lowered so as to bring the lower edge portion of the rotary drill bit 64 into abrading engagement with the glass plate GP and into coaxial alignment with the partially drilled hole formed therein and upon the opposite side thereof. Rotation of the drill bit 64 may then be continued until the desired hole is drilled entirely through the ceramic work GP. The drill bit 64, adapter 59, spindle 58, and sleeve 31 may again be raised by manipulation of the drill press control handle 32 and the tubular member 42 may then be lowered by releasing the foot pedal or treadle 44 and the dish-shaped drain member 69 and drain 82—83 may be removed from the flat glass plate or like work GP which may then be removed from the work supporting table 34.

It will be noted in connection with the operation of the form of the new ceramic drill shown in Figs. 1 to 10, inclusive, that by thus drilling the desired hole through the glass plate GP or like ceramic sheet partially from each side thereof, while the area of the ceramic sheet through which the hole is being drilled is mounted upon the resilient cushioning member 39, certain desirable results are obtained. Among these are the fact that the glass in the vicinity of the hole being drilled is not shattered at one side of the glass plate or like ceramic sheet GP as would be and is the case when it is attempted to drill entirely through a flat glass plate or like sheet of ceramic material entirely from one side thereof, when employing a drill bit such as the drill bit 64, since in such instances the drill bit tends to shatter the glass as the drill bit approaches the bottom surface of the glass plate or like ceramic sheet and it has been found substantially impossible to prevent this in attempting to drill a hole through a glass plate or the like entirely from one side thereof when employing a drill bit such as the drill bit 64.

However, by following the practice of the present invention, and drilling the desired hole through the ceramic material partially from each side thereof, fracturing or shattering of the glass at one surface thereof is prevented and clean, uniformly sized precision holes are obtained.

It will also be observed that since in the use of the new ceramic drill no extraneous or added finely divided abrasive is employed, in conjunction with the drill bit 64, as has been the customary practice heretofore, scratching of the surface of the flat glass plate or like ceramic sheet GP caused by wiping away such finely divided ceramic material, after the drilling operation, is prevented. In this manner, an objectionable feature incidental to use of the prior art portable ceramic drills is eliminated since in the use of such drills it has been customary to employ an added extraneous finely divided abrasive material which has had a tendency to scratch the surface of the glass when the excess of the added extraneous finely divided abrasive material is wiped off after the conclusion of the hole drilling operation and this has been particularly objectionable where glass plates thus drilled have been intended for use in or as windows, including display cabinet windows, for mirrors, desk and table tops, and like uses where ornamental appearance is an important factor.

It will also be observed that since the use of the new ceramic drill does not require the use of any added or extraneous finely divided abrasive material or powder, it is possible to secure uniformly sized holes since the tubular drill bit 64 is not itself abraded or worn away by any added or extraneous finely divided abrasive material as it progresses through the ceramic material during the drilling operation as has occurred in the use of portable ceramic drills heretofore used and which have employed a finely divided abrasive material.

It will also be noted that the size of the adapter 59 may be varied so that tubular drill bits 64 of various sizes or diameters may be mounted upon the lower end portion of the hollow spindle 58 and used in the form of the new ceramic drill shown in Figs. 1 to 10, inclusive.

A modified form of the new work locating or work guiding means is illustrated in Figs. 13 and 14 and in this form of the invention those parts which correspond to similar parts in the form of the invention shown in Figs. 1 to 10, inclusive, have been given the same reference numerals followed by the distinguishing reference character "a."

In the form of the invention shown in Figs. 13 and 14, the work supporting table 34a is provided with an annular recess 94 and a correspendingly shaped guide or work locating member 95 is arranged in this recess 94. The guide or work locating member 95 is provided with a central opening 96 which is circumscribed by an upstanding flange 97 which is preferably formed integrally with the body of work locating or guide member 95. This work locating or guiding flange 97 projects upwardly above the upper surface of a rubber or like resilient cushioning disc 39a which corresponds, in general, to the resilient cushioning disc 39 in the form of the invention shown in Figs. 1 to 10, inclusive. However, in the form of the invention which is shown in Figs. 13 and 14, the resilient disc 39a is arranged or seated upon the body or base of the work locating or guide member 95, within a correspondingly shaped opening formed in the resilient pad 37a, and the resilient disc 39a is provided with a centrally arranged opening 40a for the reception of the unstanding work locating or guide flange 97, as is shown in Fig. 13. It will also be noted by reference to Fig. 13 that the upper surface of the resilient cushioning disc 39a projects slightly above the upper surface of the resilient pad 37a so that the lower surface of the glass plate or like ceramic sheet GPA rests upon the upper surface of the resilient cushioning disc 39a and is spaced slightly above the upper surface of the resilient pad 37a, during the drilling operation, as indicated at SA in Fig. 13.

The modified form of the work locating means shown in Figs. 13 and 14 may be substituted for certain of the parts embodied in the form of the invention shown in Figs. 1 to 10, inclusive, which is to say that the tubular guide 42 and associated operating mechanism 43—44—45—46—47—48—49—50—51 may be eliminated when the work locating or guide member 95—96—97 is employed since the work locating member 95—96—97 in this event takes the place of the tubular work locating or guide member 42.

Thus in the use of the modification shown in Figs. 13 and 14 a hole may be partially drilled through the ceramic work GPA, employing the rotating and other parts, including the dish-shaped drain member 78 and drain 82—83 in the manner hereinbefore described, in connection with the description of the form of the invention shown in Figs. 1 to 10, inclusive. The dish-shaped element 78 and drain 82—83 may then be removed from the work and the work turned over and the partially drilled hole formed therein arranged above and in coaxial alignment with the upstanding work locating or guide flange 97 so that the annular work guiding or work locating flange 97 projects into the annular recess or partially drilled hole in the flat glass plate or like ceramic sheet GPA, as shown in Fig. 13. The rotary drill bit 64a may then be lowered and further rotated to complete the drilling operation.

It will be noted, in this connection, that just as the tubular work guiding or work locating member which is embodied in the form of the invention shown in Figs. 1 to 10, inclusive, assures proper coaxial alignment of the tubular drill bit 64 with the partially drilled hole previously formed in the ceramic work GP, the upstanding annular work locating or guiding flange 97 upon the work guiding or work locating member 97 assures and accomplishes the same result in that it assures proper coaxial alignment and centering of the rotary drill bit 64a with the previously partially drilled opening in the ceramic work GPA.

A modified form of the new glass drilling apparatus is illustrated in Figs. 15, 16 and 17 of the drawings and those parts there shown which correspond to similar parts in the form of the invention shown in Figs. 1 to 14, inclusive, have been given the same reference numerals followed by the additional and distinguishing reference character "a" or "A."

The form of the invention shown in Figs. 15, 16 and 17 is substantially similar to the form of the invention illustrated in Figs. 1 to 14, inclusive, except that in this form of the invention the cooling fluid or water supply pipe 52a has a lower end portion 52b which extends downwardly through the central bore or passage 66a in the adapter 59a.

The use of the form of the invention shown in Figs. 14, 15 and 16 is substantially the same as the use of the form of the invention shown in Figs. 1 to 14, inclusive, except that when the adapter 59a and the drill bit 64a carried thereby are raised, by manipulation of the parts 33a—32a, etc., (Fig. 15), after the operation of drilling a hole H in the glass plate GPA, the lower end edge of the pipe 52a—52b abuts the glass plug P removed from the hole H and positively and mechanically and automatically ejects the said glass plug P from the lower end portion of the tubular diamond drill bit 64a, if the glass plug P is lifted up out of the hole H when the drill bit 64a is raised after the completion of a drilling operation, as may happen. In this way the plug H is ejected from the lower end portion of the drill bit prior to the time the drill bit 64a is lowered to initiate the next succeeding drilling operation and in this way possible rupture of or other damage to the drill bit 64a or to the abrasive inserts 73a embodied therein is prevented.

It will thus be seen from the foregoing description, considered in conjunction with the accompanying drawings, that the present invention provides a new and improved drilling apparatus especially adapted for rapid drilling of flat glass, and having the desirable characteristics and securing the desired advantages and accomplishing its intended results including those hereinbefore specifically pointed out and others which are inherent in the invention.

It will also be seen from the foregoing description, considered in conjunction with the accompanying drawings, that the present invention provides a new and improved tubular metal diamond drill bit for use in the new glass drilling apparatus and a novel and efficient method of making said tubular diamond drill bit and the abrasive inserts embedded therein to the end that the new tubular diamond drill bit has a relatively long useful or working life when used for drilling holes in flat glass or like work and will enable the rapid and economical drilling of holes in flat glass and like work.

We claim:

1. Drilling apparatus comprising, in combination, a supporting frame including a portion providing a work supporting surface adapted to support a sheet of flat glass or like work during the operation of drilling a hole therein, a tubular rotary drill bit, means for supporting the said rotary drill bit above the said work supporting surface, means for vertically raising and lowering the said supporting means and the said tubular rotary drill bit carried thereby, relative to the said work supporting surface and relative to a sheet of flat glass or like work supported thereon, means for rotating the said tubular rotary drill bit in abrading engagement with a sheet of flat glass or like work arranged upon said work supporting surface so as to drill an annular recess partially through the said sheet of flat glass or like work from the upper surface thereof, an annular member movably mounted upon the said supporting frame below the said work-supporting surface and having a portion receivable in the said annular recess in the said sheet of flat glass or like work when the said sheet of flat glass or like work is inverted upon the said work supporting surface so as to retain the said annular recess in coaxial alignment with the said tubular rotary drill bit during the operation of completing the drilling of said hole through said sheet of flat glass or like work, and means for raising said annular member relative to the said work-supporting surface and the work supported thereon.

2. Drilling apparatus as defined in claim 1 in which the said supporting means for the said tubular rotary drill bit includes a vertically extending hollow rotary spindle having communication at its lower end with the said tubular rotary drill bit and in which said drilling apparatus includes means for supplying a cooling fluid to the interior of said tubular rotary drill bit through the said rotary spindle during the drilling operation.

3. Drilling apparatus as defined in claim 1 which includes means for supplying a cooling fluid to the interior of said tubular rotary drill during the drilling operation.

4. Drilling apparatus as defined in claim 1 in which said annular member is in the form of a vertically extending and vertically reciprocable tubular member carried by the said supporting frame in coaxial alignment with the said tubular rotary drill and in which said drilling apparatus includes manually operable means for moving the said vertically reciprocable annular member relative to the said supporting frame so that the upper end portion of the said annular member may be disposed in said annular recess formed in the said sheet of flat glass or like work disposed upon said work supporting surface.

5. Drilling apparatus as defined in claim 1 in which said annular member is in the form of a vertically extending and vertically reciprocable tubular member carried by the said supporting frame in coaxial alignment with the said tubular rotary drill and in which said drilling apparatus includes means normally urging the said vertically extending tubular member upwardly so as to dispose the upper end portion thereof in the said annular recess formed in the said sheet of flat glass or like work disposed upon said work supporting surface and in which said drilling apparatus includes foot-operated means carried by said supporting frame for lowering said vertically extending annular member relative to the said work supporting surface and against the action of said urging means.

6. Drilling apparatus as defined in claim 1 which includes means for supplying a cooling fluid to the interior of said tubular rotary drill bit during the drilling operation, and in which said drilling apparatus includes means comprising a manually operable dish-shaped drain element removably mounted upon the upper surface of the said sheet of flat glass or like work for carrying away from the abrading surface of said tubular rotary drill bit the cooling fluid supplied thereto during the drilling operation, and in which said dish-shaped drain element has a centrally arranged opening formed therein through which the lower end portion of said rotary drill bit may be projected when the said drilling apparatus is in use.

7. Drilling apparatus as defined in claim 1 in which said work supporting surface comprises a relatively large and substantially flat resilient pad carried by the said work supporting frame and a relatively small and substantially flat resilient pad disposed below said tubular rotary drill and above the said annular member and in coaxial alignment therewith and in which upper surface of said relatively small resilient pad projects slightly above the upper surface of said relatively large resilient pad for yieldably supporting and cushioning a sheet of flat glass or like work during the hole drilling operation.

8. Drilling apparatus as defined in claim 1 in which said work supporting surface comprises a resilient sheet provided with an opening disposed below said tubular rotary drill bit and above the said annular member and in coaxial alignment therewith and in which said drilling apparatus includes a resilient cushioning member arranged in said opening and having a substantially flat horizontal surface extending slightly above the upper surface of said resilient pad for yieldably supporting and cushioning a plate of flat glass or like work during the hole drilling operation.

9. Driling apparatus as defined in claim 1 in which said work supporting surface comprises a relatively large and substantially flat body carried by the said work supporting frame and a relatively small and substantially flat resilient cushioning member disposed below said tubular rotary drill and above the said annular member and in coaxial alignment therewith and in which the upper surface of said resilient cushioning member projects slightly above the upper surface of said relatively large flat body for yieldably supporting and cushioning a sheet of flat glass or like work during the hole drilling operation, and in which said annular member comprises a body rigidly carried by the said work supporting frame and having an annular portion projecting slightly above the upper surface of said relatively small resilient cushioning member and in coaxial alignment with the said tubular rotary drill bit.

10. Drilling apparatus as defined in claim 1 in which said work supporting surface comprises a resilient pad provided with an opening disposed below said tubular rotary drill bit and above the said annular member and in coaxial alignment therewith, and in which said drilling apparatus includes a resilient cushioning member arranged in said opening and having a substantially flat horizontal portion projecting slightly above the upper surface of said resilient pad for yieldably supporting and cushioning a plate of flat glass or like work during the hole drilling operation, and in which the said substantially flat horizontal portion of said resilient cushioning member has a centrally arranged annular opening therein and in which said annular member includes a body rigidly attached to the said supporting frame and having an annular portion attached thereto and in which said annular portion is disposed in the said centrally arranged annular opening in the said resilient cushioning member and has its upper edge projecting above the said substantially flat upper surface of the said resilient cushioning member.

11. Drilling apparatus comprising the combination of a supporting frame including a work-supporting surface, a tubular drill bit including a tubular metal wall portion having finely divided diamond particles embedded therein and exposed upon the cutting or abrading surface thereof, power-operated means for rotating said tubular drill bit, manually operable means for raising and lowering said tubular drill bit relative to the said work-supporting surface and the work carried thereby, means for supplying a cooling fluid to the interior of said tubular drill bit during the drilling operation, and means including a tubular member movably mounted upon said supporting frame below said work-supporting surface and coaxial with said tubular drill bit for locating a partially drilled area of a piece of flat glass or like work in coaxial alignment with said tubular drill bit and therebelow.

12. Drilling apparatus as defined in claim 1 in which the said supporting means for the said tubular rotary drill bit includes a vertically extending hollow rotary spindle having communication at its lower end with the said tubular rotary drill bit and in which said drilling apparatus includes means for supplying a cooling fluid to the interior of said tubular rotary drill bit through the said rotary spindle during the drilling operation, and in which said means for supplying a cooling fluid to the interior of said tubular rotary drill bit includes a vertically extending tubular member stationarily mounted relative to said tubular drill bit and having a lower end portion extending into the lower end portion of said tubular drill bit when the said tubular drill bit is raised so as to eject from the said lower end portion of said tubular drill bit a plug of glass or other ceramic material which may have become lodged in the said lower end portion of said rotary drill bit during or as a result of a drilling operation.

13. Drilling apparatus as defined in claim 1 in which the said supporting means for the said tubular rotary drill bit includes a vertically extending hollow rotary spindle having communication at its lower end with the said tubular rotary drill bit and in which said drilling apparatus includes means for supplying a cooling fluid to the interior of said tubular rotary drill bit through the said rotary spindle during the drilling operation, and in which said drilling apparatus includes means for mechanically and automatically ejecting a plug of glass or other material from the lower end portion of said rotary drill bit when the said rotary drill bit is raised after the completion of a drilling operation.

KURT SOMMER.
PAUL MACA.
EDW. EDWARDS.
WILLIAM BUDIG.